F. H. FULCHER.
HANDLE ATTACHING DEVICE FOR TOOLS.
APPLICATION FILED OCT. 16, 1911.
1,034,992.
Patented Aug. 6, 1912.
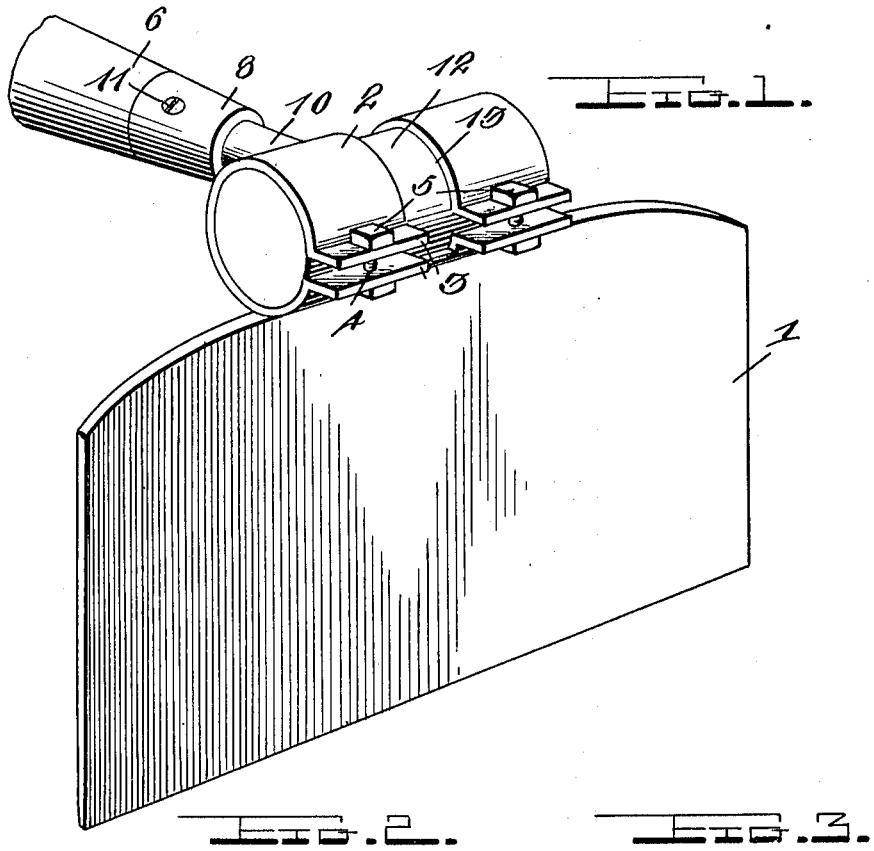
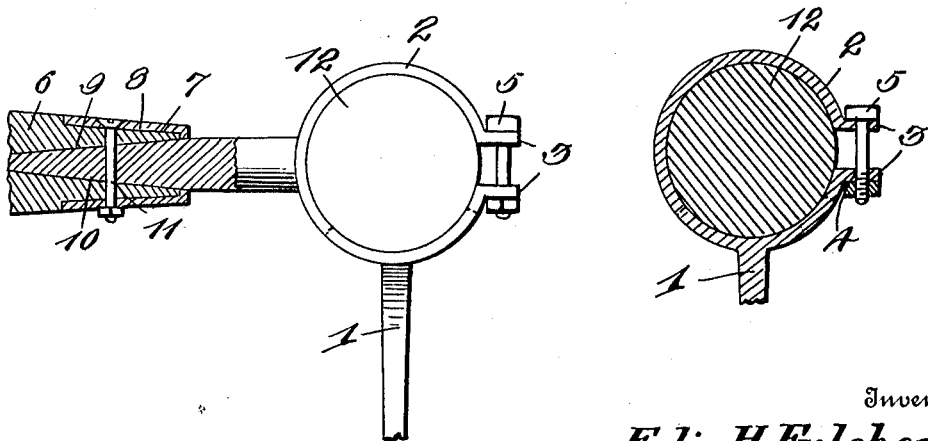
Witnesses
Chas. L. Griesbauer.
L. G. Ellis.
Inventor
Felix H. Fulcher,
By Watson E. Coleman.
Attorney

UNITED STATES PATENT OFFICE.

FELIX H. FULCHER, OF COLFAX, LOUISIANA.

HANDLE-ATTACHING DEVICE FOR TOOLS.

1,034,992.  Specification of Letters Patent.  Patented Aug. 6, 1912.

Application filed October 16, 1911. Serial No. 654,876.

*To all whom it may concern:*

Be it known that I, FELIX H. FULCHER, a citizen of the United States, residing at Colfax, in the parish of Grant and State of Louisiana, have invented certain new and useful Improvements in Handle-Attaching Devices for Tools, of which the following is a specification, reference being had to the accompanying drawings.

This invention relates to new and useful improvements in devices for attaching handles to hoes, rakes, and other farming and garden tools, its object being to provide a strong and durable attaching device which will secure the implement firmly and snugly to the handle, and permit of the ready detachment or adjustment and replacement of said implement.

With the above and other objects in view, the invention consists in the novel features of construction and the combination and arrangement of parts hereinafter described, pointed out in the claims and shown in the accompanying drawings, in which—

Figure 1 is a perspective view of a hoe connected to its handle by attaching devices constructed according to my invention; Fig. 2 is a side elevation; and Fig. 3 is a detail sectional view.

Referring more particularly to the drawings 1 indicates the blade of the hoe, having a socket 2 formed integral with the upper edge thereof. The edges of said socket are bent at right angles to the body portion as shown at 3 and are provided with the bolt receiving openings 4 adapted to receive the clamp bolts 5.

The numeral 6 indicates the handle made as usual of wood and having the reduced end 7 on which is mounted the ferrule 8. The lower end of the handle 6 is provided with an opening 9 adapted to receive the shank 10, said shank being secured in the end of the handle by means of the bolt 11 passing through the handle and through the shank. Formed integral with the shank and disposed at right angles thereto is the head 12 adapted to be disposed in the socket 2.

To secure the handle to the hoe one of the clamp bolts is removed and the head 12 is then inserted into the socket until the shank is disposed in the transverse slot 13, the bolt is then replaced and the handle then adjusted to any desired position and held in place by securely tightening the clamp bolts. The slot 13 is provided so that the handle can be adjusted to various angles with relation to the hoe blade.

The implement constructed as above described is adapted to a great variety of uses; among which the following may be mentioned. When the blade is adjusted in a line parallel with the handle the implement may be used as a spade, a sod cutter, a pruning tool and as a tool that may be employed for cutting strawberry runners or other vines. The blade may also be adjusted at such angles as to render it extremely useful in digging and removing dirt from postholes where an ordinary spade or shovel is not easily managed.

While I have shown and described the preferred form of my invention, it will be obvious that various changes in the details of construction and in the proportions may be resorted to for successfully carrying my invention into practice without sacrificing any of the novel features or departing from the scope thereof.

Having thus described the invention what is claimed is:—

1. In a tool of the character described, the combination of a handle, a ferrule upon the end of said handle, a shank secured in the end of said handle, a head formed integral with said shank and disposed at right angles to the longitudinal axis of the shank, a tool having a socket formed integral therewith to receive said head, said socket having a centrally arranged slot therein to form integrally connected clamping members, and means for tightening said members upon the head to hold the handle in an adjusted position, whereby the handle may be adjusted to various angles with relation to the tool.

2. In a tool, the combination of a handle, a ferrule upon the end of said handle, a shank secured in the end of said handle, a head formed integral with said shank and disposed at right angles thereto, a tool, a socket formed integral with said tool to receive said head, said socket having a transverse slot formed therein to allow the handle to be adjusted to various angles with relation to the tool, lugs formed integral with the outer edges of said socket, said lugs having openings formed therein and bolts disposed in said openings to tighten and loosen the socket and allow the handle to be adjusted and held in an adjusted position with relation to the tool.

In testimony whereof I hereunto affix my signature in the presence of two witnesses.

FELIX H. FULCHER.

Witnesses:
DANIEL ORR,
W. T. DUNCAN.

Copies of this patent may be obtained for five cents each, by addressing the "Commissioner of Patents, Washington, D. C."